(12) United States Patent
Lacreu (10) Patent No.: US 7,740,264 B2
(45) Date of Patent: Jun. 22, 2010

(54) QUICK RELEASE STEM

(76) Inventor: Alejandro Lacreu, 302 W. 79th St., New York, NY (US) 10024

( * ) Notice: Subject to any disclaimer, the term of this patent is extended or adjusted under 35 U.S.C. 154(b) by 376 days.

(21) Appl. No.: 11/866,544

(22) Filed: Oct. 3, 2007

(65) Prior Publication Data

US 2009/0090212 A1 Apr. 9, 2009

(51) Int. Cl.
*B62K 21/22* (2006.01)
(52) U.S. Cl. .................. 280/279; 74/551.1; 74/551.3
(58) Field of Classification Search ................. 280/279, 280/280, 272, 276, 278, 287; 743/551.1, 743/551.3, 551.2
See application file for complete search history.

(56) References Cited

U.S. PATENT DOCUMENTS

| | | |
|---|---|---|
| 511,479 A | 12/1893 | Westbrook |
| 564,741 A | 7/1896 | Dunn |
| 578,180 A | 3/1897 | Wood |
| 586,307 A | 7/1897 | Dickson |
| 602,600 A | 4/1898 | Green |
| 602,625 A | 4/1898 | La Fave |
| 604,187 A | 5/1898 | Castle |
| 610,469 A | 9/1898 | Blashfield |
| 618,681 A | 1/1899 | Jerome |
| 622,490 A | 4/1899 | Kelly |
| 624,232 A | 5/1899 | Marty, Jr. |
| 624,643 A | 5/1899 | Gaylor |
| 639,765 A | 12/1899 | Phipps |
| 641,118 A | 1/1900 | Kelly |
| 645,884 A | 3/1900 | Blashfield |
| 647,366 A | 4/1900 | Blaker |
| 660,576 A | 10/1900 | Justen |
| 663,195 A | 12/1900 | McGuire |
| 679,086 A | 7/1901 | Luce |
| 689,217 A | 12/1901 | Palmer |
| 1,068,158 A | 7/1913 | Noack |
| 1,146,053 A | 7/1915 | Croston |
| 1,379,784 A | 5/1921 | Schwartz |
| 1,595,557 A | 8/1926 | Mamiya |
| 2,204,908 A | 6/1940 | Olson |
| 2,280,662 A | 4/1942 | Pawsat |
| 2,303,241 A | 11/1942 | Taman |
| 2,358,035 A | 9/1944 | Schwinn |
| 2,487,661 A | 11/1949 | McCauley, Jr. |

(Continued)

OTHER PUBLICATIONS

Notification of Transmittal of the International Search Report and the Written Opinion of the International Searching Authority, or the Declaration (1 page) for related application PCT/US2008/010461.

(Continued)

*Primary Examiner*—Tony H. Winner
(74) *Attorney, Agent, or Firm*—Amster, Rothstein, & Ebenstein, LLP (57) ABSTRACT

A stem connecting the handlebars and steerable fork of a cycle has one tube attached to the handlebars and another tube attached to the steerable fork with the tubes capable of being rotated and locked with respect to one another. This arrangement allows for various configurations of the handlebars and fork including the typical riding configuration as well as an alternate configuration where the handlebars are 'folded' with respect to the fork. Change in configuration is accomplished without tools by way of a biased locking arrangement for the tubes.

18 Claims, 11 Drawing Sheets

U.S. PATENT DOCUMENTS

| | | | |
|---|---|---|---|
| 3,306,684 A | 2/1967 | Klein, Jr. | |
| 3,481,218 A | 12/1969 | Yoshikawa | |
| 3,660,995 A | 5/1972 | Klein, Jr. | |
| D224,473 S | 7/1972 | Humlong et al. | |
| 3,785,676 A | 1/1974 | Klein, Jr. | |
| 3,863,521 A | 2/1975 | Gatsos et al. | |
| 4,023,436 A | 5/1977 | Dodge | |
| 4,113,395 A | 9/1978 | Pawsat et al. | |
| 4,337,962 A | 7/1982 | Allen et al. | |
| 4,361,057 A | 11/1982 | Kochera | |
| 4,384,497 A | 5/1983 | Gatsos | |
| 4,417,745 A | 11/1983 | Shomo | |
| 4,601,483 A | 7/1986 | McMurtrey | |
| 4,682,509 A | 7/1987 | Takamiya et al. | |
| 4,688,817 A | 8/1987 | Marier | |
| 4,729,255 A | 3/1988 | Moulton | |
| D307,405 S | 4/1990 | Kiyota | |
| 4,939,950 A | 7/1990 | Girvin | |
| 5,133,224 A | 7/1992 | Prins | |
| 5,138,900 A | 8/1992 | Hals | |
| 5,197,349 A | 3/1993 | Herman | |
| 5,213,006 A | 5/1993 | Liao | |
| 5,269,550 A | 12/1993 | Hon et al. | |
| 5,273,302 A | 12/1993 | Ureel | |
| 5,323,664 A | 6/1994 | Fairfield et al. | |
| 5,327,798 A | 7/1994 | Lerch et al. | |
| 5,330,302 A | 7/1994 | Chen | |
| 5,419,573 A | 5/1995 | Kao | |
| 5,494,302 A * | 2/1996 | Farris et al. | 280/276 |
| 5,562,013 A | 10/1996 | Kao | |
| 6,186,027 B1 | 2/2001 | Nielsen | |
| 6,343,891 B1 | 2/2002 | Combs | |
| 6,637,288 B2 | 10/2003 | Chu | |
| 6,912,928 B1 | 7/2005 | Thomson et al. | |
| 7,207,237 B2 | 4/2007 | Johnson | |
| 7,243,573 B2 | 7/2007 | Bass et al. | |
| 2002/0166406 A1 * | 11/2002 | Dunlap | 74/551.1 |
| 2005/0206120 A1 * | 9/2005 | Liao | 280/281.1 |
| 2006/0076752 A1 | 4/2006 | Montague et al. | |

OTHER PUBLICATIONS

International Search Report (2 pages) for related application PCT/US2008/010461.

Written Opinion of the International Searching Authority (5 pages) for related application PCT/US2008/010461.

Dahon® Speed D7 Bicycle with Folding Stem, www.dahon.com/us/speedd7.htm.

* cited by examiner

QUICK RELEASE STEM

BACKGROUND

The stem of a cycle, e.g. a bicycle, connects the handlebar with the steerable front wheel through the fork; the fork holding the front wheel. The quill is the vertical portion of the stem. In many designs the quill and the stem are unitary. The stem and the quill are critical parts on a bicycle because all forces the rider's arms make while pedaling go through the stem and the quill to the frame, and if either of them breaks there is no way to hold the bicycle with the hands and the rider will consequently end up on the ground. Stems are often adjustable in different ways: Some or all of the height, the angle to a vertical plane, and the angle on a horizontal plane, may be adjustable in different combinations.

The setting for the long axis of the handlebar when the bicycle is being ridden is perpendicular to the plane of the front wheel. However, at the time of storing or transporting a bike on an elevator or a train, that setting may become inconvenient. Although this angle is usually adjustable, it requires a tool and takes significant time to adjust to and from the riding setting. In addition, the parts for accomplishing this adjustment are not designed to be used very often, e.g. any time it is desired to turn the handlebars parallel to the plane of the front wheel for storage or travel.

Foldable bicycles usually have foldable stems or quills while non-foldable bicycles typically come with handlebars that, at best, are only foldable with special tools and knowledge as well as substantial time and effort. Examples of patents disclosing foldable handlebars include U.S. Pat. Nos. 5,269,550; 5,419,573; 6,637,288 and 7,243,573.

SUMMARY OF THE INVENTION

The present invention is a cycle stem having handlebars attached to a top thereof, a fork attached to a bottom thereof and an adjustable quill, the adjustable quill comprising: an inside tube having an inside tube axis and an inside tube disc, the inside tube disc having formed therein an aperture radially spaced from the inside tube axis; an outside tube having an outside tube axis and an outside tube disc, the outside tube disc having formed therein an aperture radially spaced from the outside tube axis; and a locking element selectively disposed in one of an unlocked position and a locked position, the unlocked position characterized in that the locking element is disposed in only one of the outside tube aperture or the inside tube aperture and the locked position characterized in that the locking element is disposed in both the outside tube aperture and the inside tube aperture.

A biasing element may also be provided, exerting a force toward the locked position of the locking element. This force may be overcome with a button on one of either the inside tube or the outside tube, thus moving the unit toward the unlocked position of the locking element.

The locking element may be in the form of locking pins, each locking pin disposed adjacent a spring urging the locking pin into the locked position. Pushing pins may also be provided, disposed in the other of the inside tube aperture or the outside tube aperture and arranged to exert a force on the locking pins to overcome the urging force and push the locking pins into the unlocked position.

A preferred embodiment of the cycle stem includes a bearing element radially disposed between the outside tube and the inside tube. The bearing element may be any one of a low friction sleeve, a plurality of ball bearings or at least one needle bearing.

The adjustable quill of the present invention may, alternatively, be described as a first tube attached to a handlebar of the cycle; a second tube attached to a wheel fork of the cycle; and locking means for selectively locking and unlocking the first tube and the second tube in rotational relationship with one another. The locking means may include a biasing element exerting a force toward a locked position of the locking element; and a button on one of either the inside tube or the outside tube, the button adapted to have an external force exerted thereon capable of overcoming a biasing force from the biasing element toward an unlocked position of the locking element. This locking means may also include a first tube disc having first tube disc apertures therein; a second tube disc having second tube disc apertures therein; and at least one locking element disposed, in an unlocked position, only in the first tube disc apertures and, in a locked position, in both the first and second tube disc apertures.

In a preferred embodiment of the present invention, the locking element includes locking pins, each locking pin disposed adjacent a spring urging the locking pin into the locked position. The locking element may further have pushing pins disposed in the second tube aperture capable of exerting a force on the locking pins to overcome the spring urging force and push the locking pins into the unlocked position. In another preferred embodiment of the present invention, the locking element has locking tabs of complementary shape to first and second tube disc apertures.

BRIEF DESCRIPTION OF THE DRAWINGS

FIG. 1c is a cross sectional plan view of FIG. 1a taken along section line A-A;

FIG. 1d is a cross sectional plan view of FIG. 1b taken along section line B-B;

FIGS. 2a-2d are the same views as FIGS. 1a-1d but with needle bearing instead of low friction sleeve;

FIG. 9c is a cross section plan view of FIG. 9b taken along section line C-C;

DETAILED DESCRIPTION OF THE INVENTION

Figure 11:
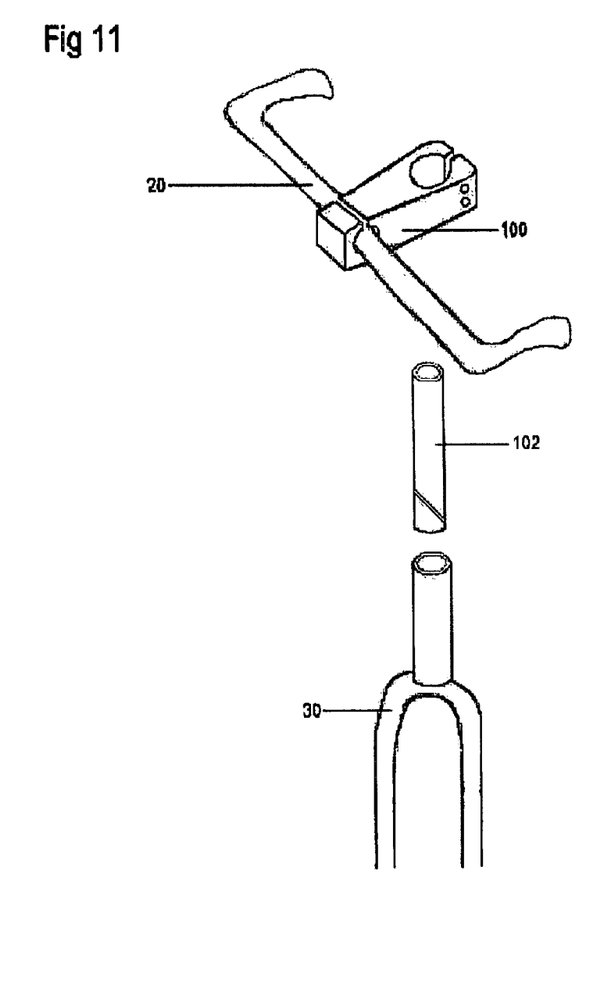
FIG. 11 is an exploded perspective view of a cycle steering mechanism showing the context of the present invention.
Figure 12:
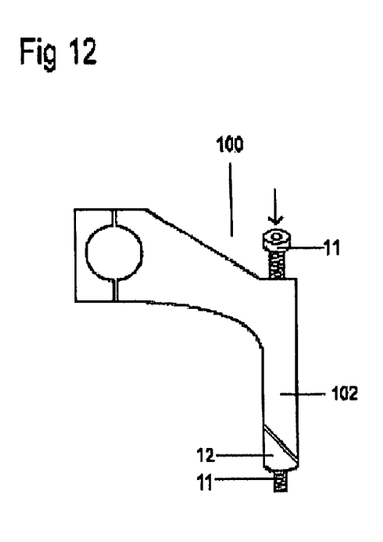
FIG. 12 is a side plan view of a bicycle stem.

FIGS. 11 and 12 show the quill 102 of the present invention and its relationship to the handlebars 20, stem 100 and fork 30 of a typical bicycle. Anchoring bolt 11 is also shown due to its importance in attaching the quill 102 to the fork 30.

Figures 1, 1A, 1B:
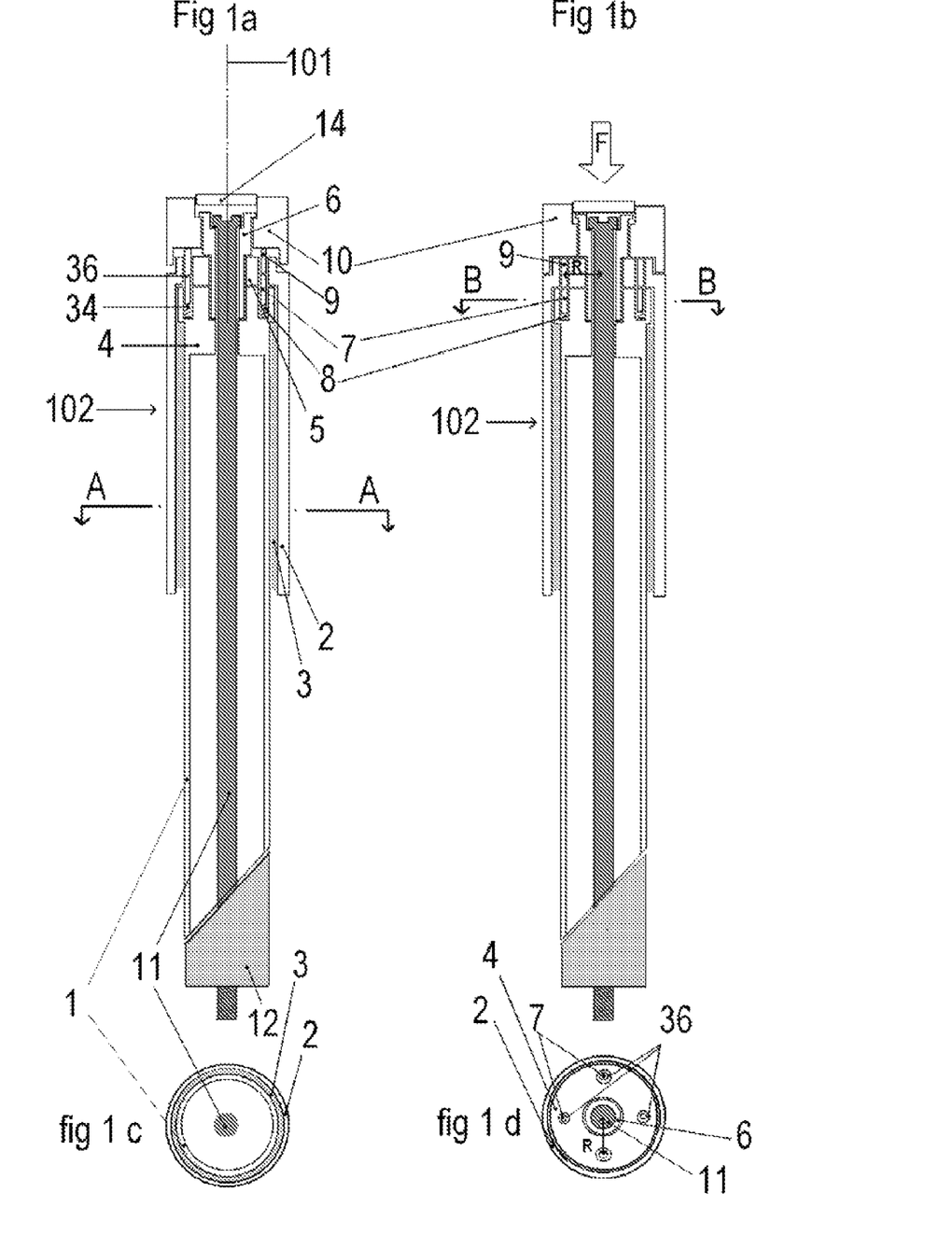
FIG. 1a is a cross sectional plan view of a portion of the stem of the present invention.
FIG. 1b is a cross sectional plan view of a portion of the stem of the present invention.

FIG. 1a is a cross section of the quill 102 of one possible embodiment of the present invention, showing the quill 102 having an inside tube 1 locked with respect to an outside tube 2. Because the inside tube 1 is attached to the fork 30 and the outside tube 2 is attached to the handlebar 20, locking the inside tube 1 and the outside tube 2 with respect to one another locks the handlebar 20, fork 30 and front wheel 32 in a particular arrangement. One advantageous arrangement of the handlebar 20 and fork 30 is where the handlebar 20 is perpendicular to the plane of the front wheel 32. Another advantageous arrangement of the handlebar 20 and fork is where the handlebar 20 is parallel to the plane of the front wheel 32, i.e. the handlebar 20 is 'folded'.

FIG. 1b shows a cross section of inside tube 1 unlocked from, i.e. rotatable with respect to, outside tube 2. Inside tube 1 is rotatable with respect to outside tube 2 because lock pins 7 have been pushed into an 'unlocked' position, to be further discussed below. In the arrangement shown in FIG. 1b, the handlebar 20 may be rotated while the fork 30 and, thus, the front wheel 32 are not rotated. This is how an arrangement of the handlebar 20 for riding is transformed from or to an arrangement for storage or other arrangement in which it is useful to have the handlebars 20 folded.

Disposed at the top of inside tube 1 is quill disc 4. Quill disc 4 comprises a group of holes 34 extending into the quill disc 4 parallel to the centerline 101. Centerline 101 defines an axis of both the inside tube 1 and the outside tube 2 in addition to other structural elements of the present invention. Each hole 34 has a center located a distance "R" from the centerline 101. Stem disc 5 is disposed in or is part of outside tube 2. Stem disc 5 also comprises a group of holes 36 extending into stem disc 5 parallel to the centerline 101 and centered a distance "R" from the centerline 101. Disposed between inside tube 1 and outside tube 2 is a bearing element such as a low friction sleeve 3. The low friction sleeve 3 may also be a ball bearing or a needle bearing. Low friction sleeve 3 keeps both tubes 1 and 2 in concentric alignment. Quill disc 4 and stem disc 5 are arranged such that holes 34 and 36 may be caused to line up by rotating inside tube 1 and outside tube 2 with respect to one another. Bushing 6 keeps this arrangement. In the embodiment of FIG. 1 quill disc 4 is located below stem disc 5.

Each of inside tube 1, outside tube 2, bushing 6, quill disc 4 and stem disc 5 have concentric through holes therein. A long anchoring bolt 11 extends through these holes and holds each of these elements together. Bolt 11 also anchors stem 100 to the fork 30 of the bicycle by anchoring nut 12.

Holes 34 and 36 are sized to receive lock pins 7. Springs 8 at the bottom of either holes 34 or 36 and lock pins 7 are adjacent springs 8. Each lock pin 7 is biased by spring 8 to extend a distance beyond the top of the hole in which the spring 8 to which it is attached is located. When holes 34 and 36 are in alignment, the portions of lock pins 7 extending beyond the tops of holes 34 may extend into aligned holes 36.

In FIGS. 1a and 1b, holes 34 are shown having a lock pin 7 and adjacent spring 8. In this arrangement, occupying holes 36 in the stem disc 4 are push pins 9 which push lock pins 7 and compress springs 8 when a particular push pin 9 is aligned with a particular lock pin 7 and button 10 is operated on by force "F", shown in FIG. 1b. Thus, if lock pin 7 is aligned with hole 36 then spring 8 will bias lock pin into hole 36; if no counteractive force is present, e.g. from push pin 9 as a result of force F, then lock pin 7 will be permitted to enter hole 36. The length of lock pin 7 is chosen such that a portion thereof will always be disposed in hole 34. Thus, if lock pin 7 enters hole 36 then it is no longer possible to rotate inside tube 1 with respect to outside tube 2, i.e. the tubes are locked. When force F is exerted on button 10, push pins 9 are caused to transmit this force to lock pins 7 thereby compressing springs 8. Once springs 8 are compressed sufficiently that the tops of lock pins 7 exit completely holes 36, inside tube 1 and outside tube 2 may be rotated with respect to one another.

Figures 9, 9A, 9B:
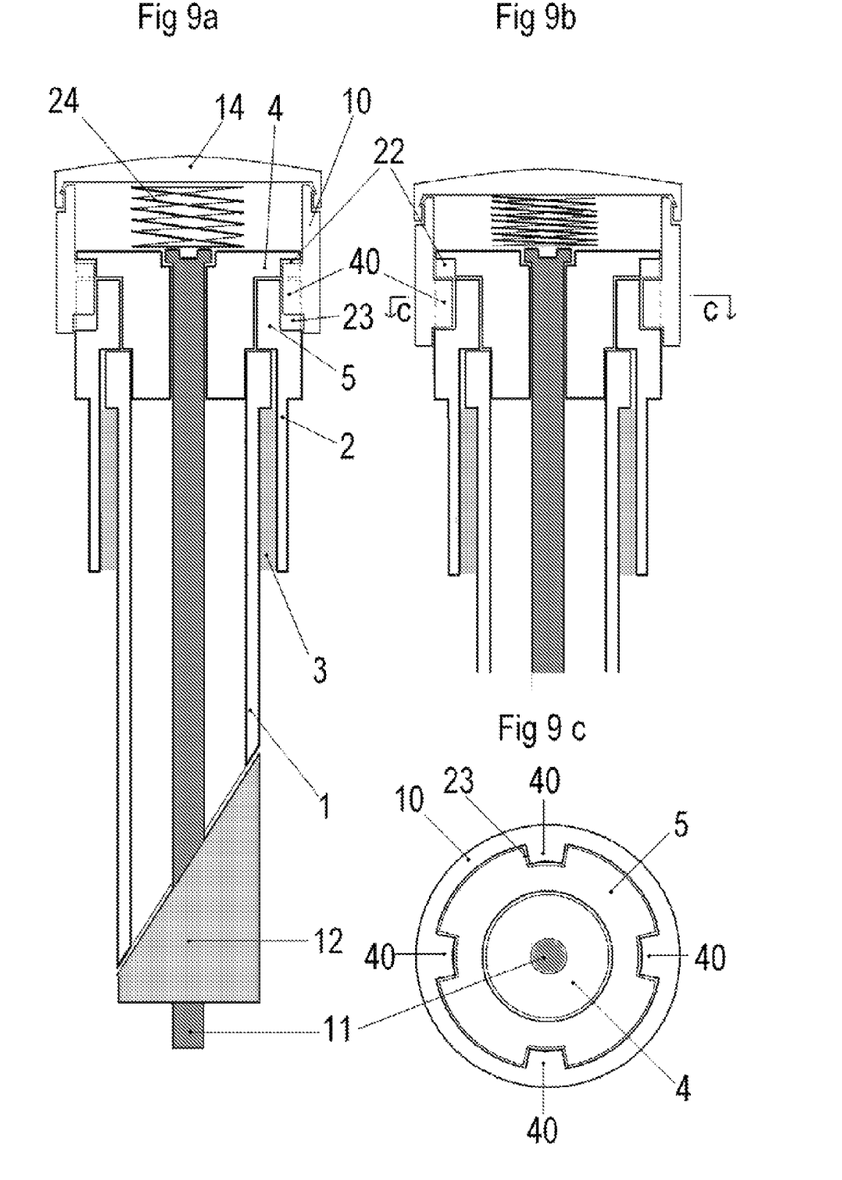
FIG. 9a is a cross sectional plan view of a different preferred embodiment of the present invention.
FIG. 9b is a cross section detail of the different preferred embodiment in an unlocked arrangement.

Thus, lock pins 7 entering holes 36 lock a particular arrangement of handlebar 20 and fork 30 and attached front wheel. It is possible to change this arrangement by applying force F on button 10, which causes push pins 9 to force lock pins 7 out of holes 36, and then turning outside tube 2 with respect to inside tube 1 until a desirable and available lockable arrangement of handlebar 20 and fork 30 is reached, at which point force F is released and springs 8 again force lock pins 7 into holes 36, preventing relative rotation of tubes 1 and 2. Springs 8 comprise the primary bias in the system. However, it is not necessary that springs 8 are the only source of bias. Among other places, more robust biasing elements 24 may contact the top face of quill disc 4 and bottom face of cup 14, as shown in FIG. 9.

A cup 14 on top of the button 10 prevents water from entering into the mechanism.

When stem disc 5 has been rotated with respect to the quill disc 4 such that holes 34 are not aligned with holes 36 the button 10 can be released because the lock pins 7 cannot enter holes 36 and merely slide along the bottom face of stem disc 5. Tubes 1 and 2 are unlocked and will rotate with respect to one another until lock pins 7 are again in alignment with holes 36. If the number of holes 34, 36 in each disc 4, 5 is four and there is an equal angular distance between each successive hole, the mechanism may be locked every 90 degrees.

Figures 2, 2B:
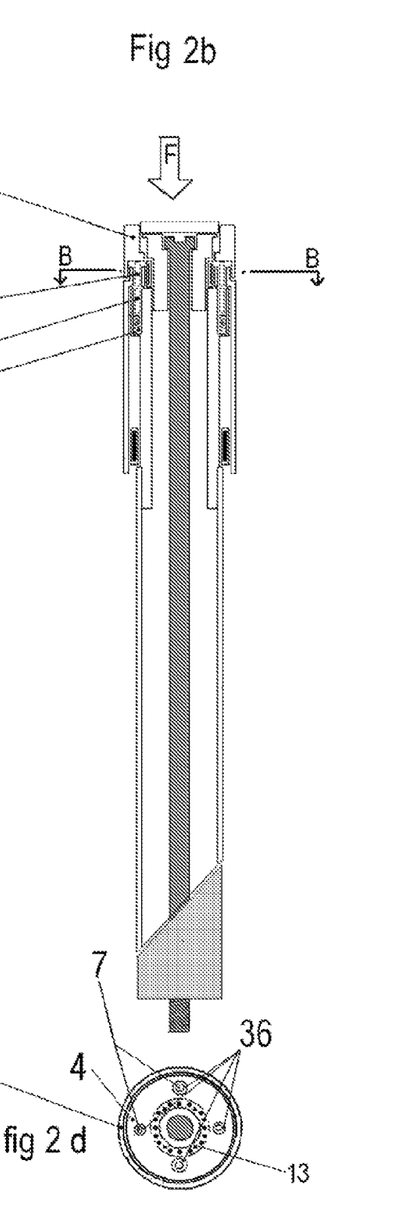
Figures 2, 2A:
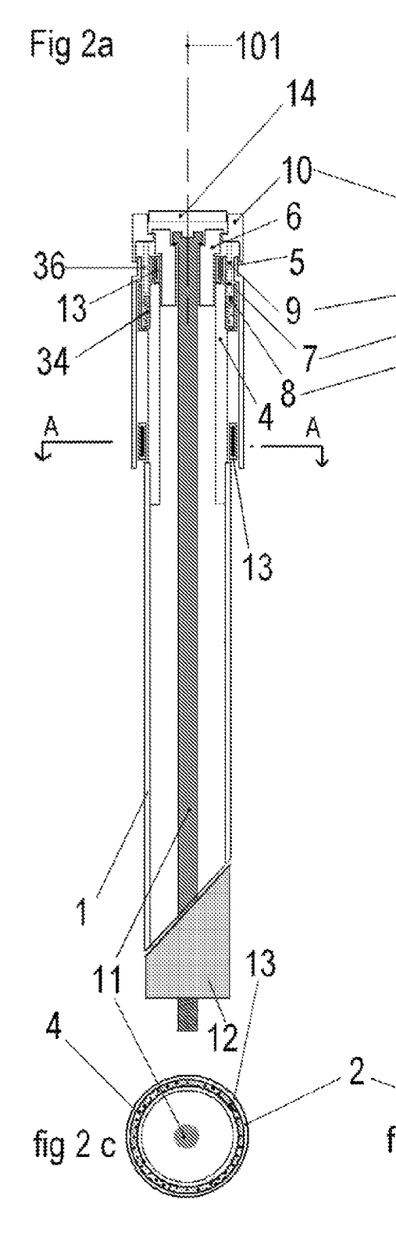

FIG. 2 shows an alternative embodiment where low friction sleeve 3 has been replaced by needle bearings 13, one adjacent the bottom of outside tube 2 and the other one adjacent the stem disc 5 and the bushing 6.

Figures 3A, 3B:
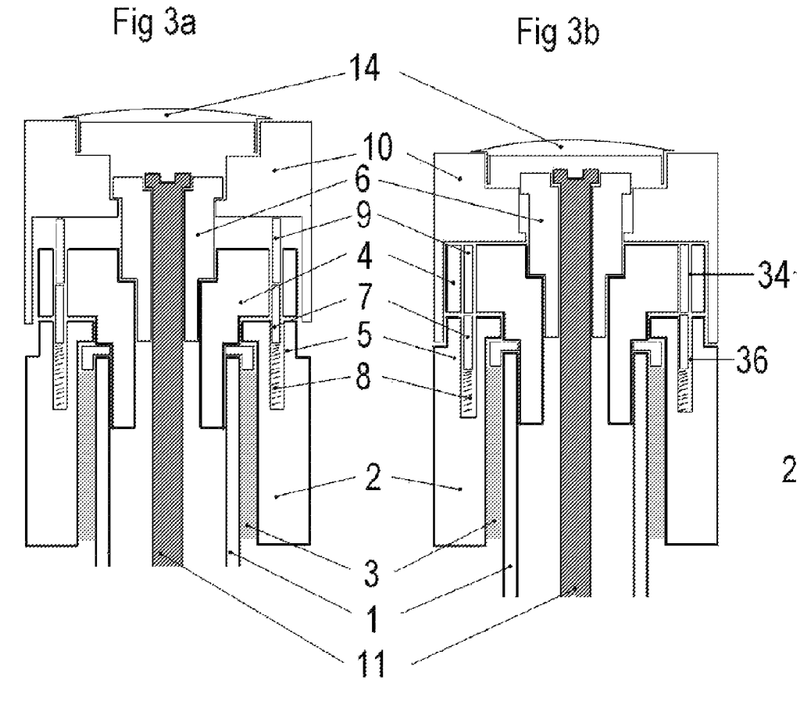
FIGS. 3a-3c are cross section details of an alternate embodiment of the present invention.
Figure 3C:
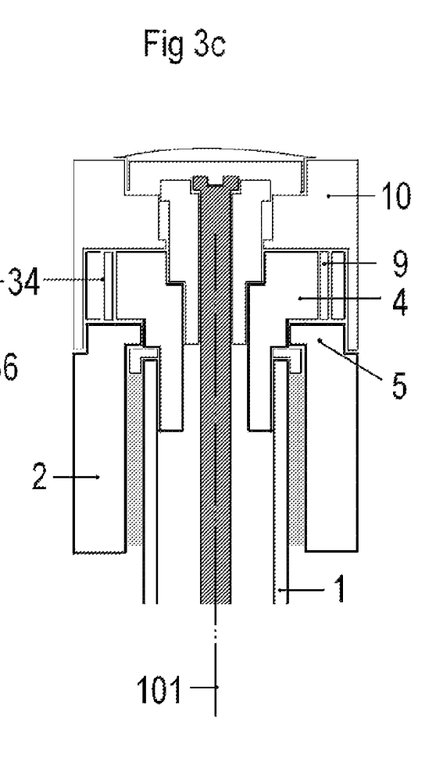

FIG. 3a is a detailed cross section showing the lock pins 7 extending into both discs 4 and 5. Thus, FIG. 3a shows a locked arrangement. FIG. 3b shows the same cross section but the button 10 has been pressed down by force F, thus the push pins 9 have pushed down the lock pins 7 compressing the springs 8 and placing the lock pins 7 in the unlocked position ready to be rotate. FIG. 3c shows the same cross section through outside tube 2 but with inside tube 1 rotated slightly; this is possible because tubes 1 and 2 are unlocked from one another. The springs 8 are still biasing the lock pins 7 but the tops of pins 7 abut the bottom surface of quill disc 4, which provides the balancing force to the spring 8 bias.

Figure 4:
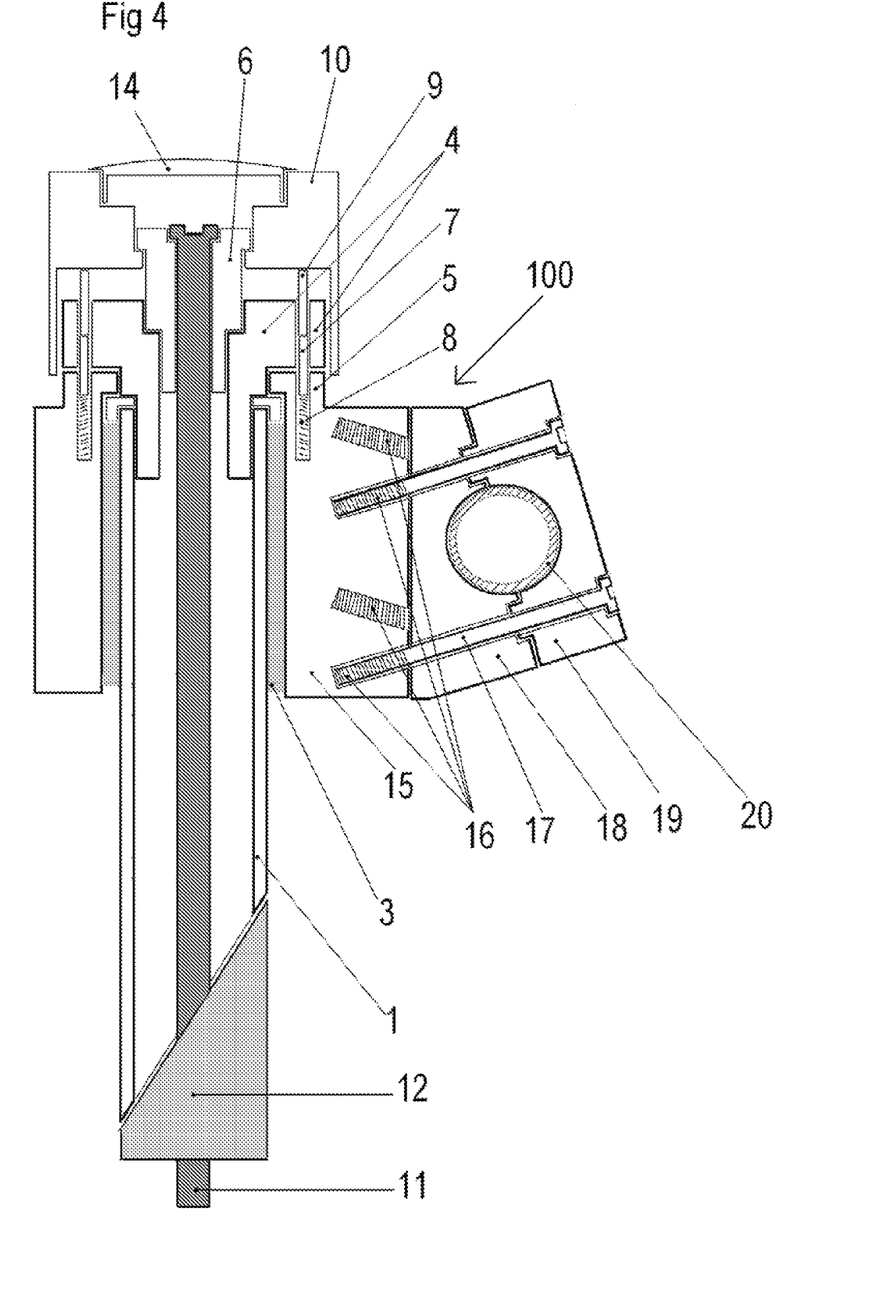
FIG. 4 is a cross sectional plan view of a preferred embodiment of the present invention.
Figure 5:
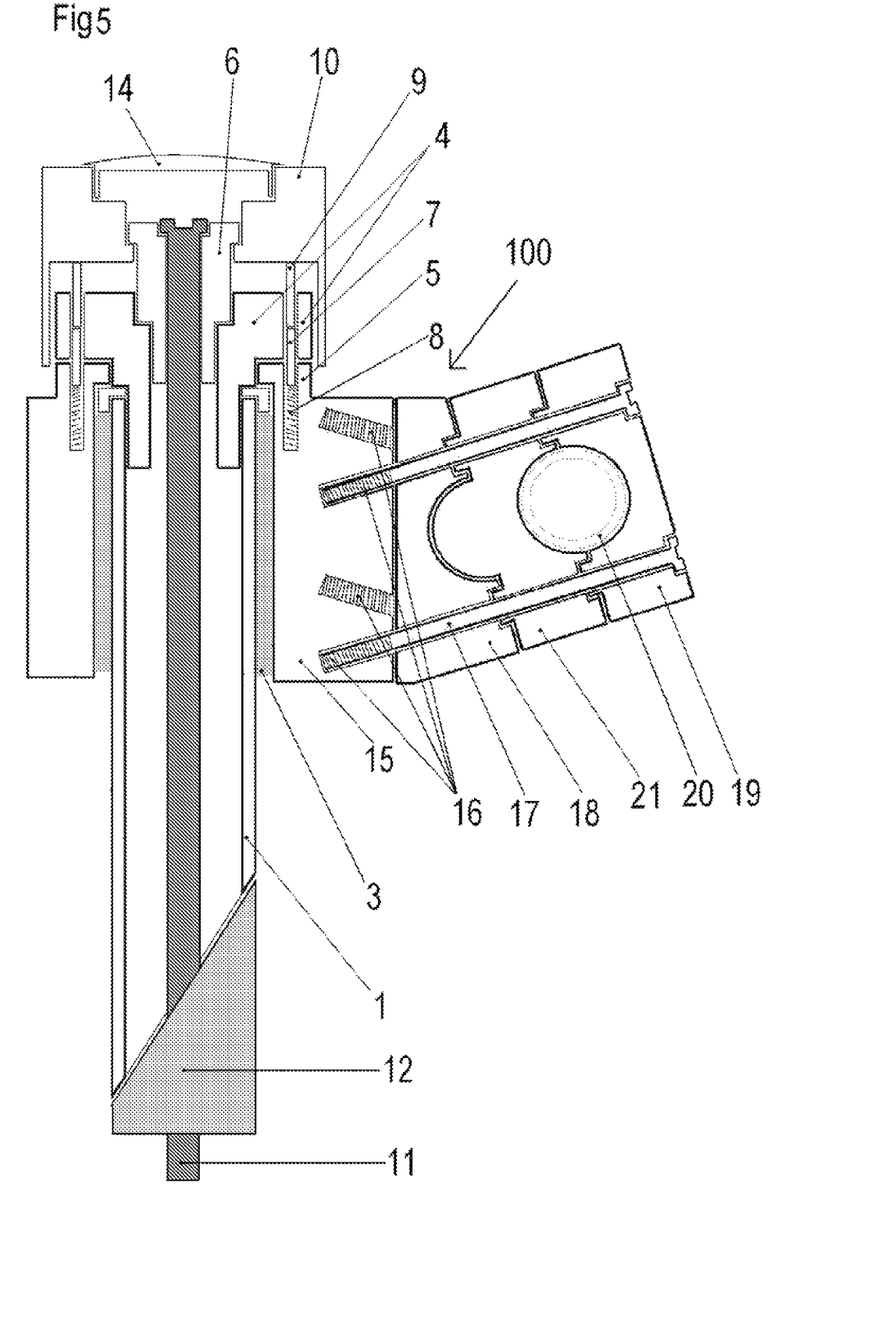
FIG. 5 is a cross sectional plan view of a preferred embodiment of the present invention.
Figure 6:
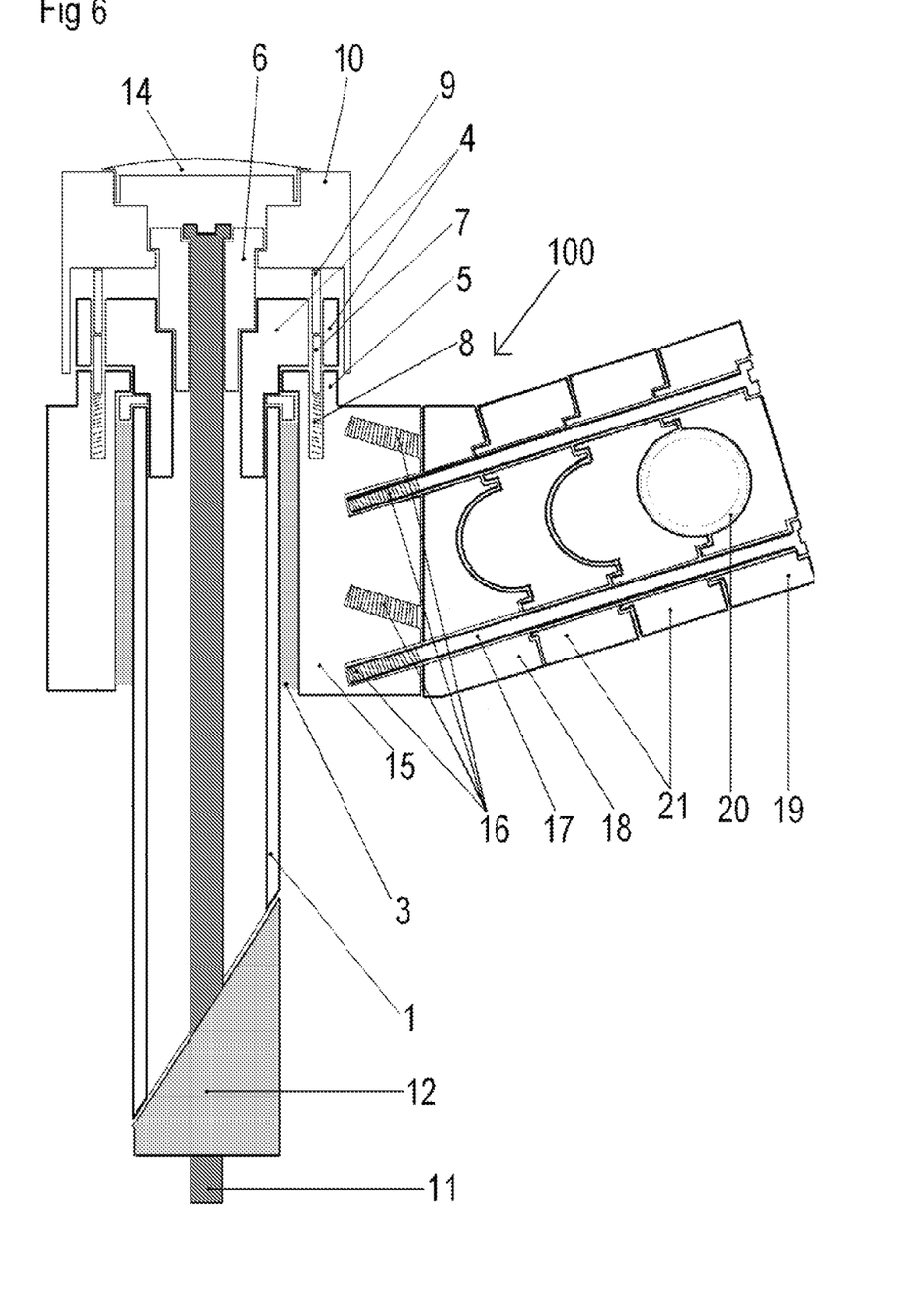
FIG. 6 is a cross sectional plan view of a preferred embodiment of the present invention.

FIG. 4 is an alternative embodiment of the present invention wherein the stem is integral with the quill. Outside tube 2 has attached thereto or formed integrally therewith a stem body 15. The stem body 15 includes a number of threaded holes 16 in which bolts 17 are screwed holding the stem 100 together. Adjustable extension 18 and handlebar holder 19 are part of the stem 100. The handlebar 20 is firmly held between the adjustable extension 18 and the handle bar holder 19. Handlebar 20 is removable and adjustable by means of bolts 17. FIG. 5 shows the same stem as FIG. 4 in which an additional extension 21 has been placed in order to elongate the stem 100, i.e. increase the distance between outside tube 2 and handlebar 20. FIG. 6 is the same as FIG. 5 but with two additional extensions 21 instead of one, showing that is possible to add as many additional extensions 21 as necessary.

Figure 7:
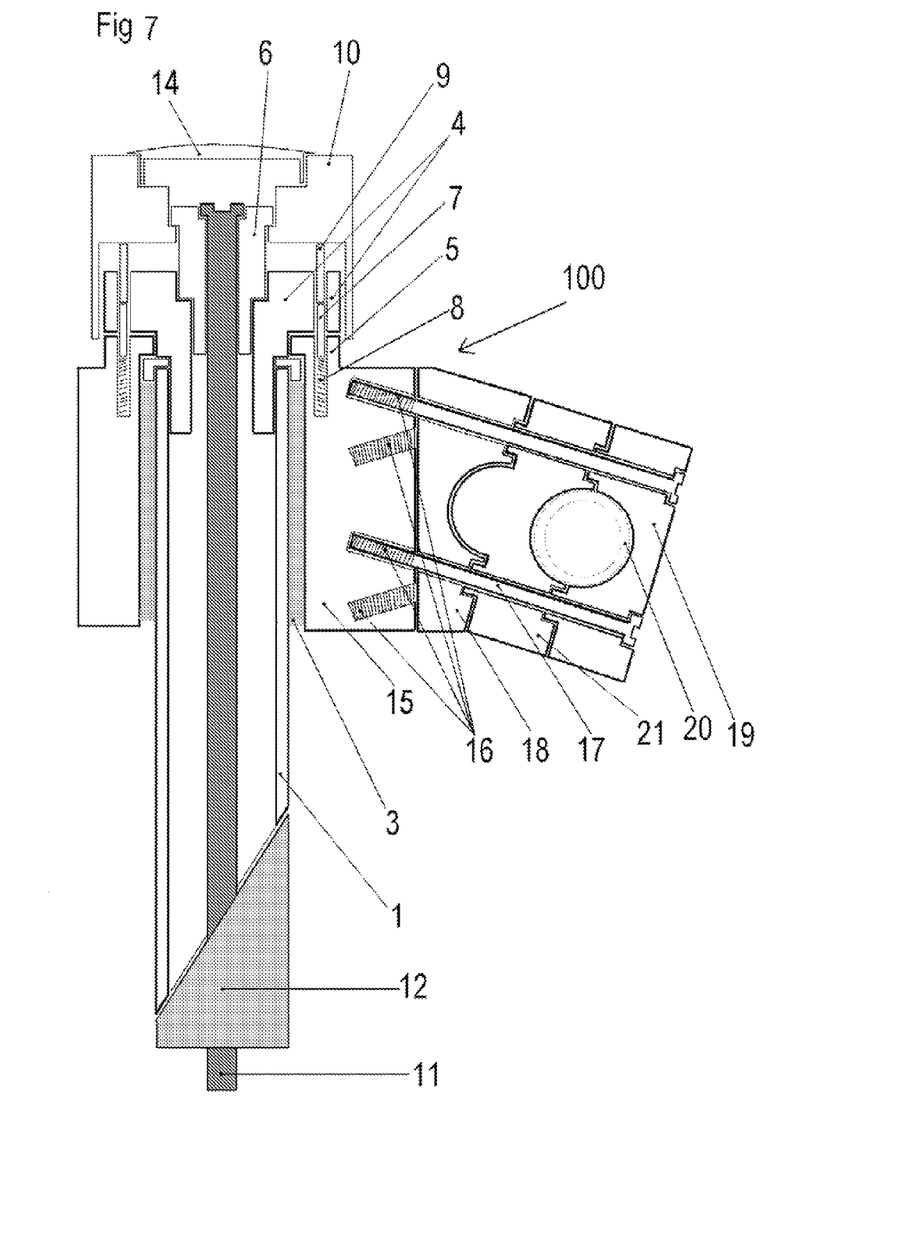
FIG. 7 is a cross sectional plan view of a preferred embodiment of the present invention.

FIG. 7 shows the stem with one additional extension 21 but in this case the stem 100 is pointing down. This is possible through rotation of the adjustable extension 18 by 180° and attachment of adjustable extension 18 against the stem body 15 using the same bolts 17 on the other set of threaded perforations 16.

Figure 8:
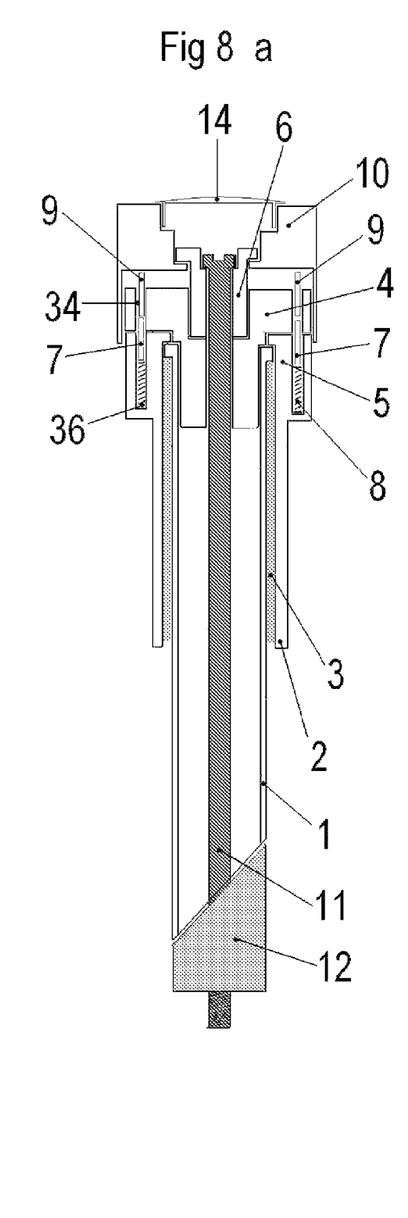
FIG. 8 is a cross sectional plan view of another preferred embodiment of the present invention.

FIG. 8a is another alternative embodiment of the invention. The quill disc 4 is above the stem disc 5. This cross section shows the mechanism locked. FIG. 8b shows button 10 pushed down, thus unlocking the mechanism and allowing inside tube 1 to rotate with respect to outside tube 2. Quill disc 4, stem disc 5, lock pins 7, push pins 9, springs 8, quill disc holes 34 and stem disc holes 36 operate in this alternative embodiment is the same way as described previously to lock inside tube 1 and outside tube 2.

FIG. 9a shows an alternative embodiment in accordance with the present invention. The locking tabs 40 are integral with or attached to button 10. The locking tabs 40 shown in FIG. 9 are keyed to quill disc slots 22, and stem disc slots 23 formed in the peripheral edge of both the stem disc 5 and the quill disc 4. FIG. 9a is a cross section showing the locked configuration. Locking tabs 40 are keyed to and extend into both quill disc slots 22 and stem disc slots 23, thus preventing relative rotation of inside tube 1 and outside tube 2. FIG. 9b is a detailed cross section showing the unlocked configuration. Pushing button 10 overcomes the force of biasing element 24, e.g. a spring, and causes button 10 to move axially toward outside tube 2 until locking tabs 40 are no longer inside quill disc slots 22. When locking tabs 40 are no longer inside quill disc slots 22, inside tube 1 may be rotated with respect to outside tube 2. Four slots in quill disc 4 and four slots in stem disc 5, set 90° apart, affords four locking positions. As with the alternative embodiment of FIG. 8, the quill disc 4 and stem disc 5 may be inverted in the embodiment of FIG. 9 and the locking tabs 40 may be associated with either the inside tube 1 and outside tube 2. FIG. 9c is a top section of the quill showing the four locking tabs 40 inside the four stem disc slots 23.

Figure 10:
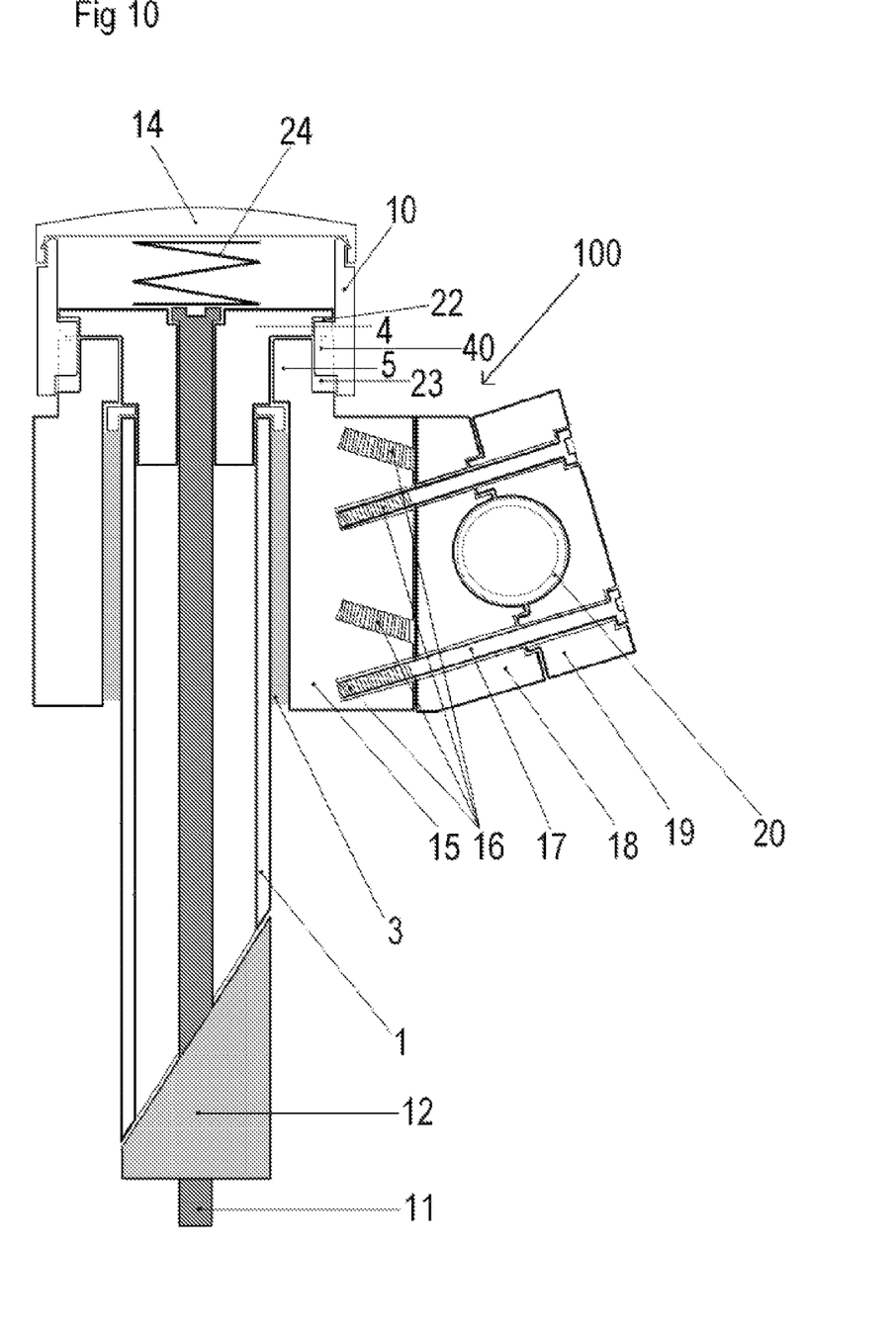
FIG. 10 is a cross section plan view of several combined preferred and alternate embodiments of the present invention.

FIG. 10 is the same embodiment as FIGS. 4, 5 and 6 with a locking mechanism like that of FIG. 9. The system is locked because locking tabs 40 are partially inside quill disc slots 22 and partially inside stem disc slots 23. Stem disc 5 is part of stem body 15. An extended biasing element 24 between the top face of the quill disc 4 and cup 14 keeps the button up and the mechanism locked.

While the foregoing invention has been described in some detail for purposes of clarity and understanding, it will be appreciated by one skilled in the art, from a reading of the disclosure, that various changes in form and detail can be made without departing from the true scope of the invention in the appended claims.

I claim:

1. A cycle stem having handlebars attached adjacent a first end thereof, a fork attached adjacent a second end thereof and an adjustable quill between the first end and second end, the adjustable quill comprising:
    an inside tube comprising an inside tube axis and an inside tube disc, the inside tube disc having formed therein at least one inside tube aperture radially spaced from the inside tube axis;
    an outside tube comprising an outside tube axis and an outside tube disc, the outside tube disc having formed therein at least one outside tube aperture radially spaced from the outside tube axis; and
    at least one locking element selectively disposed in one of an unlocked position and a locked position, the unlocked position characterized in that the locking element is disposed in only one of the outside tube aperture or the inside tube aperture and the locked position characterized in that the locking element is disposed in both the outside tube disc aperture and the inside tube disc aperture.

2. The cycle stem of claim 1 further comprising:
    at least one biasing element exerting a force toward the locked position of the locking element; and
    a button on one of either the inside tube or the outside tube, the button adapted to have an external force exerted thereon capable of overcoming the biasing element force and thus toward the unlocked position of the locking element.

3. The cycle stem of claim 1 wherein:
    the locking elements comprises a locking pin; the locking pin disposed adjacent a spring which urges the locking pin into the locked position.

4. The cycle stem of claim 3 further comprising:
    at least one pushing pin, the pushing pin disposed in the other of the inside tube aperture or the outside tube aperture and arranged to exert a force on flocking pin of the locking element to overcome the urging force of the spring and push the locking pin into the unlocked position.

5. The cycle stem of claim 1 further comprising:
    a bearing element radially disposed between the outside tube and the inside tube.

6. The cycle stem of claim 5 wherein the bearing element is one of a low friction sleeve, a plurality of ball bearings or at least one needle bearing.

7. An adjustable quill of a cycle comprising:
    a first tube attached to a handlebar of the cycle;
    a second tube attached to a wheel fork of the cycle; and
    a locking device for selectively locking and unlocking the first tube and the second tube in rotational relationship with one another, the locking device comprising:
        at least one locking element,
        a first tube disc having first tube disc apertures therein,
        a second tube disc having second tube disc apertures therein, and
        wherein the locking element is disposed, in an unlocked position, only in the first tube disc apertures and, in a locked position, in both the first and second tube disc apertures.

8. The adjustable quill of claim 7, the locking device further comprising:
    a biasing element exerting a force toward a locked position of the locking element; and
    a button on one of either the first tube or the second tube, the button adapted to have an external force exerted thereon capable of overcoming a biasing force from the biasing element toward an unlocked position of the locking element.

9. The adjustable quill of claim 7, the locking element comprising:
    a locking pin disposed adjacent a spring, the spring exerting a spring urging force on the locking pin which urges the locking pin into the locked position.

10. The adjustable quill of claim 9, the locking element further comprising:
    a pushing pin disposed in a second tube aperture capable of exerting a force on the adjacent locking pin of the locking element to overcome the spring urging force and push the locking pin into the unlocked position.

11. The adjustable quill of claim 7, the locking element comprising locking tabs of complementary shape to first and second tube disc apertures.

12. The adjustable quill of claim 7 further comprising:
a bearing element radially disposed between the first tube and the second tube.

13. A folding cycle stem having handlebars attached to a top thereof, a fork attached to a bottom thereof and a quill allowing the relative arrangement of the handlebars and fork to be adjusted without tools, the quill comprising:
an inside tube comprising an inside tube disc, the inside tube disc having formed therein an aperture;
an outside tube comprising an outside tube disc, the outside tube disc having formed therein an aperture;
a locking element selectively disposed in one of an unlocked position and a locked position, the unlocked position characterized in that the locking element is disposed in only one of the outside tube aperture or the inside tube aperture and the locked position characterized in that the locking element is disposed in both the outside tube aperture and the inside tube aperture; and
a biasing element applying a force on at least one of the inside tube and the outside tube and urging the quill into the locked position.

14. The folding cycle stem of claim 13 further comprising:
a button on one of either the inside tube or the outside tube, the button adapted to have an external force exerted thereon capable of overcoming the biasing element force and thus toward the unlocked position of the locking element.

15. The folding cycle stem of claim 13 further wherein:
the locking element comprising a locking pin, the locking pin disposed adjacent the biasing element.

16. The folding cycle stem of claim 15 further comprising:
pushing pins disposed in the other of the inside tube aperture or the outside tube aperture and arranged to exert a force on the locking pins to overcome the biasing force and push the locking pins into the unlocked position.

17. The cycle stem of claim 13 further comprising:
a bearing element radially disposed between the outside tube and the inside tube.

18. The cycle stem of claim 13 wherein the bearing element is one of a low friction sleeve, a plurality of ball bearings or at least one needle bearing.

* * * * *